United States Patent [19]
Baldwin et al.

[11] Patent Number: 5,369,433
[45] Date of Patent: Nov. 29, 1994

[54] RECORDING VIDEO SIGNALS ON CINEMATOGRAPHIC FILM USING A DEFORMABLE MIRROR DEVICE

[75] Inventors: John L. E. Baldwin, Eastleigh; Peter W. Blaxtan, Welwyn, both of United Kingdom

[73] Assignee: Rank Cintel Limited, Herts, United Kingdom

[21] Appl. No.: 864,327

[22] Filed: Apr. 6, 1992

[30] Foreign Application Priority Data

Apr. 5, 1991 [GB] United Kingdom ............... 9107144

[51] Int. Cl.$^5$ ...................... H04N 5/225; H04N 5/253
[52] U.S. Cl. .................................... 348/207; 348/771; 358/332
[58] Field of Search ............... 358/214, 97, 216, 215, 358/54, 233, 332, 225; 359/291, 292, 293, 259, 846, 847, 850; 346/107 R; 353/122; 348/207, 771; H04N 5/87, 5/782, 5/76, 1/36

[56] References Cited

U.S. PATENT DOCUMENTS

| | | | |
|---|---|---|---|
| 3,746,785 | 7/1973 | Goodrich | 359/291 |
| 3,752,906 | 8/1973 | Lowry | 358/332 |
| 4,087,176 | 5/1978 | Nigg | 358/332 |
| 4,110,014 | 8/1978 | Yevick | 350/342 |
| 4,566,935 | 1/1986 | Hornbeck | 156/626 |
| 4,615,595 | 10/1986 | Hornbeck | 353/122 |
| 4,680,579 | 7/1987 | Ott | 340/783 |
| 4,728,185 | 3/1988 | Thomas | 353/122 |
| 4,775,204 | 10/1988 | Setani | 358/233 |
| 4,842,396 | 6/1989 | Minawa et al. | 358/233 |
| 5,005,082 | 4/1991 | Zdepski et al. | 358/174 |
| 5,159,485 | 10/1992 | Nelson | 359/291 |

FOREIGN PATENT DOCUMENTS

| | | |
|---|---|---|
| 0391529 | 10/1990 | European Pat. Off. . |
| 2123247 | 1/1984 | United Kingdom ......... H04N 3/36 |
| 2123248 | 1/1984 | United Kingdom ......... H04N 1/24 |
| 2227904 | 8/1990 | United Kingdom . |

OTHER PUBLICATIONS

IEEE Transactions on Electron Devices vol. ED-30, No. 5, May 1983 pp. 539–545; L. J. L. J. Hornbeck, "128×128 Deformable Mirror Device".

Boysel, R. Mark, *Optical Engineering*, "A 128×128 Frame-Addressed Deformable-Mirror Spatial Light Modulator", Sep. 1991, vol. 30 No. 9, pp. 1422–1427.

Hornbeck, Larry J., *SPIE Critical Reviews Series*, "Deformable-Mirror Spatial /Ligh Modulators", vol. 1150, pp. 86–102.

Hornbeck, Larry J. et al., *SID 80 Digest*, "20.7/4:25 P.M.: Deformable Mirror Projection Display", pp. 228–229.

*Primary Examiner*—Michael T. Razavi
*Assistant Examiner*—Wendy R. Greening
*Attorney, Agent, or Firm*—Ostrolenk, Faber, Gerb & Soffen

[57] ABSTRACT

A video signal is recorded on unexposed cinematographic film by shining light from a light source onto a deformable mirror device (DMD), which comprises a micro-mechanical array of electronically-addressable mirror elements, the elements corresponding to individual pixels. The elements of the DMD are controlled or modulated in response to the video signal. Light is selectively reflected by the DMD onto an image plane containing the film such that the light reaching the film is representative of the video signal.

26 Claims, 7 Drawing Sheets

RECORDING VIDEO SIGNALS ON CINEMATOGRAPHIC FILM USING A DEFORMABLE MIRROR DEVICE

BACKGROUND OF THE INVENTION

This invention relates to the recording of video signals on cinematographic film.

Video signals are electrical signals representing pictures, in color or monochrome, with more than two brightness levels. The video signals would be typically derived from a television camera, a video tape recorder, or any other recording medium other than photographic film. One reason for transferring the images from other media to film is to enable the distribution of programs to the film theater. At the present time there are three methods available for the transfer of video signals to film.

These are in brief, cathode ray tube, laser scan, and electron beam scan. When using cathode ray tubes (CRTs), one has the choice of using a single tube with color filters and exposing each color separately, but this takes three times as long, or using three tubes to expose all three colors simultaneously, but then the color registration of the three images becomes a problem. Other problems include the variation of transfer characteristics between the drive to the electron guns and the light coming from the phosphor, the inherent undesirable afterglow characteristics of the phosphors, the variation of spot size with beam current, and deflection defocusing. The many variables are not conducive to reliable results.

Some improvement has been achieved by using one monochrome display and recording the red, green and blue components separately on monochrome film stock. The three prints obtained are then printed on to one film base, either using color film or by the dye transfer process. This type of system removes the major cause of problems in registering the three color images on the display, gives a wider choice of phosphor since only one is used which can be of any color to which a monochrome film will respond and avoids the problems arising from differing phosphor characteristics. On the other hand the program material has to be recorded so that it is available at three separate times for recording the red, green and blue signals, the transfer time has been tripled and problems of long term drift have become more severe.

The laser scanner is very complex because of the difficulty in deflecting laser beams at very high speed whilst maintaining sufficient resolution. The only practical method at the present time is to use a multifaceted polygon rotating at a very high speed with gas bearings. This is an extremely high precision mechanical assembly. With such systems the period during which each elemental area of the film is exposed to light is very short by comparison with normal film exposure; this tends to result in anomalous film characteristics due to reciprocity failure.

The electron beam scanner is even more complex than the laser scanner, and also uses separate passes to record three monochrome films representing the red, green and blue components of the signal. This method overcomes all the problems of phosphors since the film responds to the direct impact of the electron beam. However, the recording process including the film being scanned by the beam needs to be in vacuum to avoid problems arising from ions produced by the electron beam acting on residual gases, released particularly by the film stock. This is probably the most reliable method of transferring television programs to film but the disadvantages of sequential recording are exacerbated by the time taken to achieve an adequate vacuum, whenever the film stock reels have to he changed.

All the above have problems arising from the change of cut-off point of electron guns and also need stable high voltage supplies. A small drift of the cut-off point applying to one component can have a noticeable effect on the color balance in the shadow areas causing a color cast. Similar changes to the three components can cause noticeable changes of contrast ratio.

SUMMARY OF THE INVENTION

The invention is defined in the appended claims to which reference should now be made.

A preferred embodiment of the invention to be described below uses one or more deformable mirror device (DMD)/arrays. The film, while it is stationary, is exposed to a varying extent by light reflected by the individual pixel size mirrors of the DMD. The amount of light depends on the length of time that an individual mirror is reflecting light from a source into the aperture of a lens which images the DMD onto the film plane.

For a recorder using color film three DMD's could be used, one each for the red, green and blue information to be recorded on the film. Alternatively a single DMD could be used, together with a synchronized color filter wheel to sequentially present the red, green and blue information to be recorded on each film frame. After the end of the time when all the light exposure of the film frame is complete, the film is pulled down by the desired frame pitch before the light exposure for the next film frame commences.

For archival purposes it may be desired to record a color television frame as three separate frames on monochrome film stock, in which case the information relating to the red, green and blue picture content would be sequentially presented on a single DMD with the film being pulled down after the information relating to each color has been exposed on the film.

The transfer of a television program to film using a system in which deformable mirror devices are effectively switched to reflect light onto an elementary area of film for a required time period to give the appropriate exposure, avoids the problems of known systems and particularly of electron beam devices, whether in a sealed CRT or in a pumped vacuum chamber. The exposure can be controlled by the mark/space ratio of the DMD which is inherently more stable and free from drift than the analogue adjustments of cut-off points and drive levels of electron beam devices. A film recorder may use a separate DMD for each of the three components exposing color film directly but the basic precision of the DMD as far as the positioning of all the mirrors will be very much more accurate than the scanning of electron beams. Alternatively a film recorder may use a single DMD, time multiplexed to control all three color components. With DMDs the optics of the transfer equipment will be stable and drift free, so that attention can be applied to minimizing the one remaining cause of drift which is, of course, the film.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENT

Figure 1:
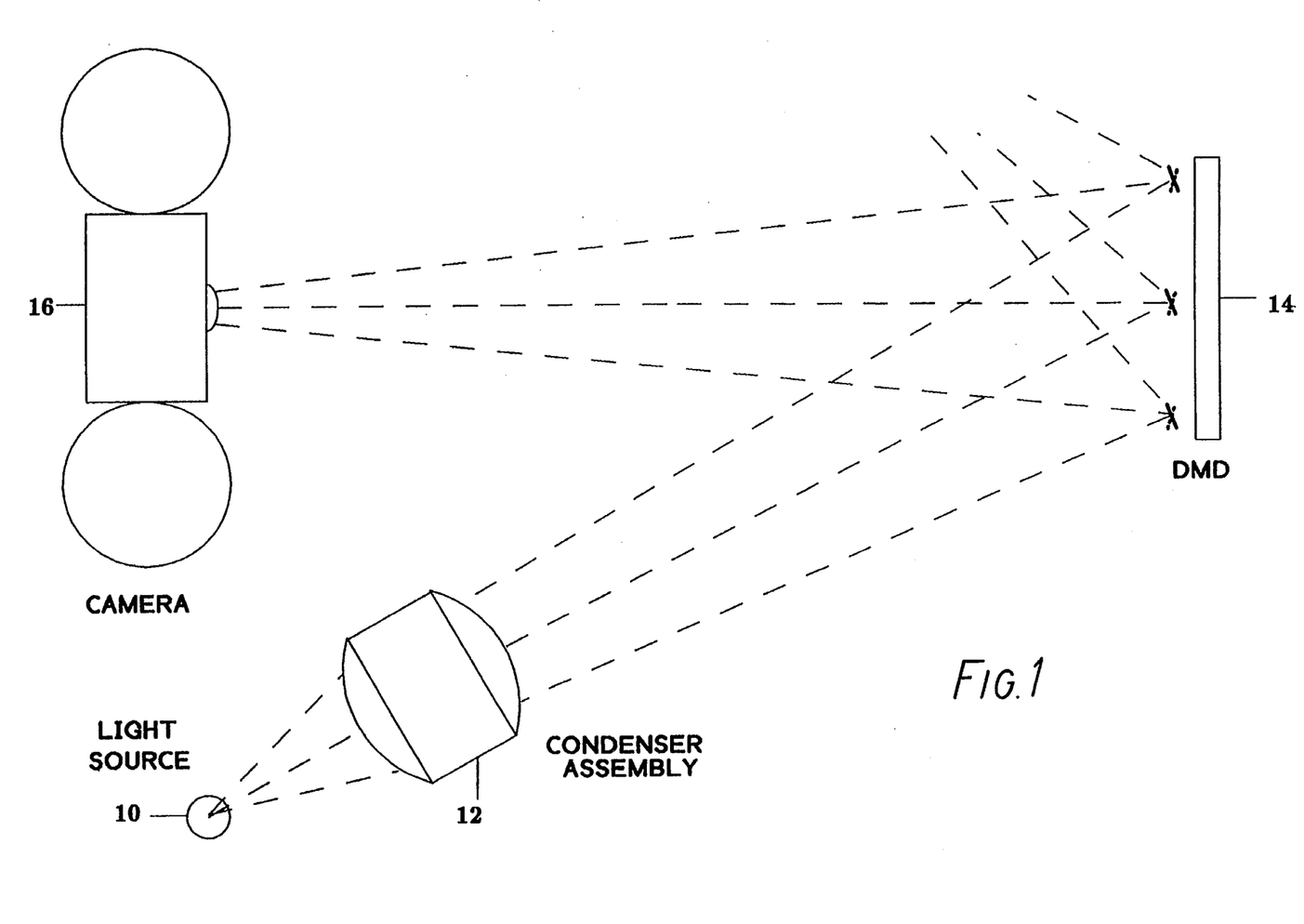
FIG. 1 is a diagram of a monochrome television film recorder embodying the invention.

FIG. 1 shows a simple arrangement for recording monochrome film. Light from a source 10 is collected by a condenser assembly 12 to form a defined beam directed towards a deformable mirror device (DMD) 14, which is a particular type of spatial light modulator. The DMD has pixel mirrors which have two stable positions, one where the incident light is directed towards a film camera 16, (ON), and the other where the incident light is directed away from the camera (OFF). The brightness amplitude of each pixel is controlled by the mark/space ratio of ON/OFF positions.

The deformable mirror device comprises a two dimensional micro-mechanical array of electronically addressable mirror elements, each of which corresponds to a respective pixel. Each pixel mirror element is capable of mechanical movement in response to an electrical input. Such movement is in practice more often a deflection rather than a deformation but the term deformable mirror device has now become accepted as the description of this class of devices. They may be digitally addressed in which case they can be referred to as digital mirror devices. The expression DMD covers all of these.

For a description of current DMD technology reference is made to HORNBECK, L. J., "Deformable-Mirror Spatial Light Modulators" Proc. SPIE Critical Reviews Series, Vol. 1150, 6–11 August 1989, San Diego, Calif., U.S.A., pp 86–102. This paper contains many references to earlier work and attention is drawn particularly to references 3, 9, 14 and 23 of that paper. Further details of the construction of the devices is found in BOYSEL, R. M., "A 128×128 frame-addressed deformable mirror spatial light modulator" Optical Engineering, Vol. 30, No. 9, September 1991, pages 1422–1427. Attention is also drawn to reference 1 in that paper which is an earlier publication by Boysel et al. It has been proposed that DMDs should be usable as projection displays, see e.g. HORNBECK, L. J., et al., "Deformable Mirror Projection Display", SID 80 Digest, pp 228–229 (Abstract of presentation delivered Jul. 20, 1980 at SID Symposium), and U.S. Pat. No. 4,680,579.

The construction and manufacture of DMDs is further described in U.S. Pat. Nos. 4,615,595 and 4,566,935 and European Patent Application EP-A-0 391 529, all of Texas Instruments Incorporated.

The following description assumes a knowledge of the above-noted prior documents, all of which are hereby incorporated by reference.

A DMD may comprise an area array of deflectable mirrors, used to modulate the light in an optical projector. There is one mirror for each picture point or pixel and each mirror is approximately 20 microns square. It is termed digital because each mirror has two positions, an "on" and an "off" position. In the "on" position, incoming light is directed through the projection lens to the display screen, and in the "off" position, light is deflected away from the projection lens, so that no light reaches the screen.

The "on" and "off" positions of each mirror are controlled by two deflection electrodes, which exert an electrostatic attraction on the mirror according to which of the electrodes has been charged with the necessary bias. In addition, there is a common bias applied to all the mirrors, to hold them in their "on" or "off" positions after the potential on the deflection electrodes has leaked away. Therefore the sequence for applying new positional information to each mirror is as follows. Just before the change, the potential on each deflection electrode could be equal, especially if some time has elapsed since the previous change, but the mirrors will remain locked in their previous position because of the common mirror bias. New potentials are now applied to all the deflection electrodes over a relatively short period of approximately 60 to 80 microseconds, but during this time the mirrors stay locked in their previous positions because of the common mirror bias. After all the deflection electrodes have been recharged, the common mirror bias is removed for approximately 10 microseconds and the mirrors are now attracted by the bias present on the deflection electrodes and will change position if this bias is different from the previous setting. The common mirror bias then returns which locks the mirrors in the new position until the next time the common mirror bias is removed.

The magnitude of the light reflected from each pixel mirror element is controlled by varying the "on/off" mark space ratio of the element, in other words, the proportion of time in a "frame" period for which each mirror is "on". If a picture is to be displayed at 50 "frames" per second, each "frame" period will be 20 milliseconds, and the maximum amount of light would be obtained if a mirror was "on" for 20 milliseconds each frame period. To reduce the number of times the mirrors are reset during a frame period to a sensible number, the "on/off" times follow a binary pattern, a frame period being divided into binary fractions of $\frac{1}{2}$, $\frac{1}{4}$, $\frac{1}{8}$, 1/16, 1/32, 1/64, etc. The use of such a binary series in a display device is known from United Kingdom Patent Applications Nos. GB-A-2014822A and 2164776A.

An example of the sequence of operation of the arrangement shown in FIG. 1 is as follows. Normally, if the incoming television signal to be recorded is 625/50 interlaced, the film camera operates at 25 frames per second, intermittently, that is, 20 milliseconds are used to transport the film by one frame, and for the remaining 20 milliseconds, the film is held stationary by one or more register pins while the film is exposed to the DMD.

Figure 3:
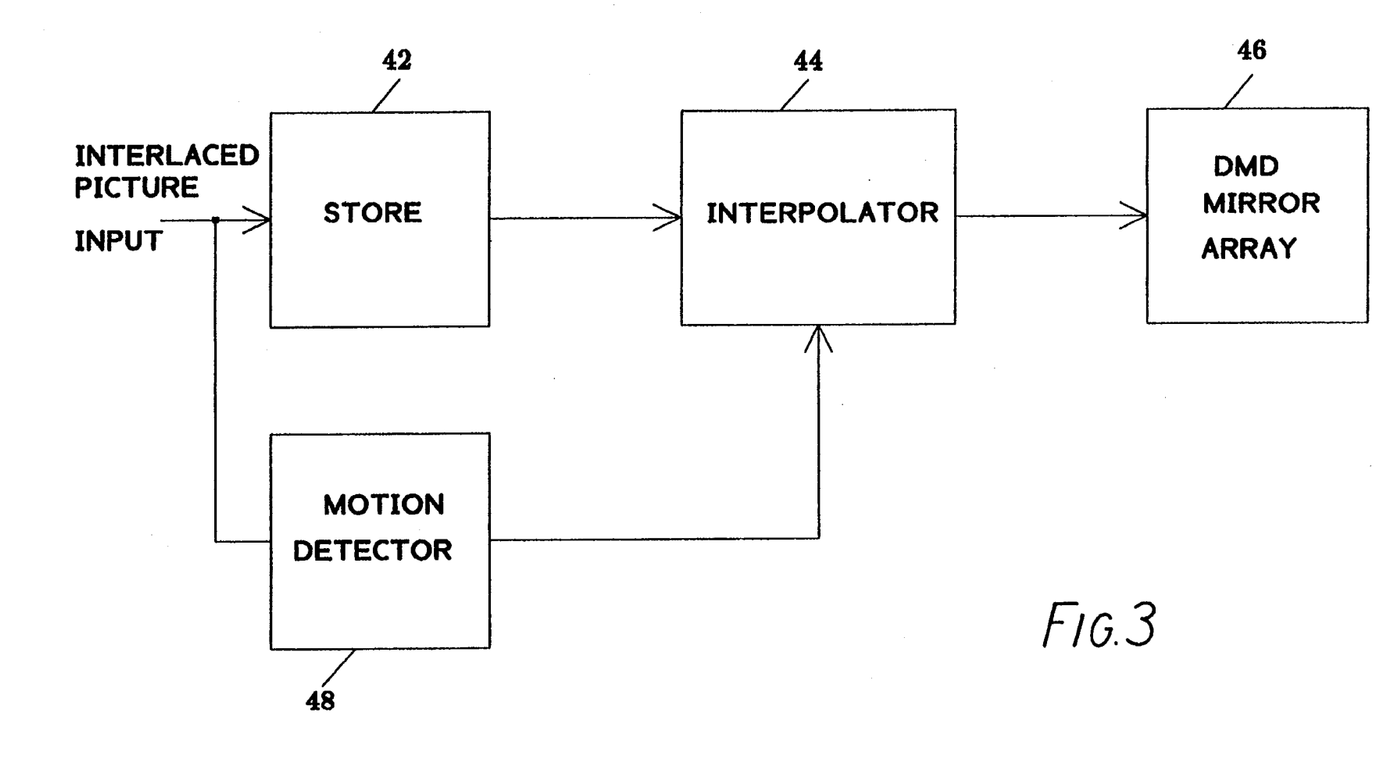
FIG. 3 is a block diagram showing the use of motion compensation to combine successive fields of a television signal to derive information appropriate for recording on film.

A complete picture frame takes 40 milliseconds to arrive at the input, and since the film is exposed in 20 milliseconds, a picture store is required. A simple block diagram of an arrangement is shown in FIG. 3.

The incoming interlaced video signal is first stored in a picture store 42, and the DMD pixel modulation data is transmitted from the store in a predefined sequence via an interpolator 44, to a DMD array 46. The purpose of the interpolator is to compensate for motion in the picture since the incoming video is at a rate of 50 pictures per second which is converted to film at 25 pictures per second in this example. The complexity of the motion compensation can vary over a wide range depending upon the quality of picture required. Typically, a motion detector 48 will look at every pixel in the picture over a number of picture frames, and instruct the interpolator to compensate only those pixels where motion has occurred. Therefore, pixels which have not changed due to motion will pass through the interpolator uncompensated.

Figure 4A:
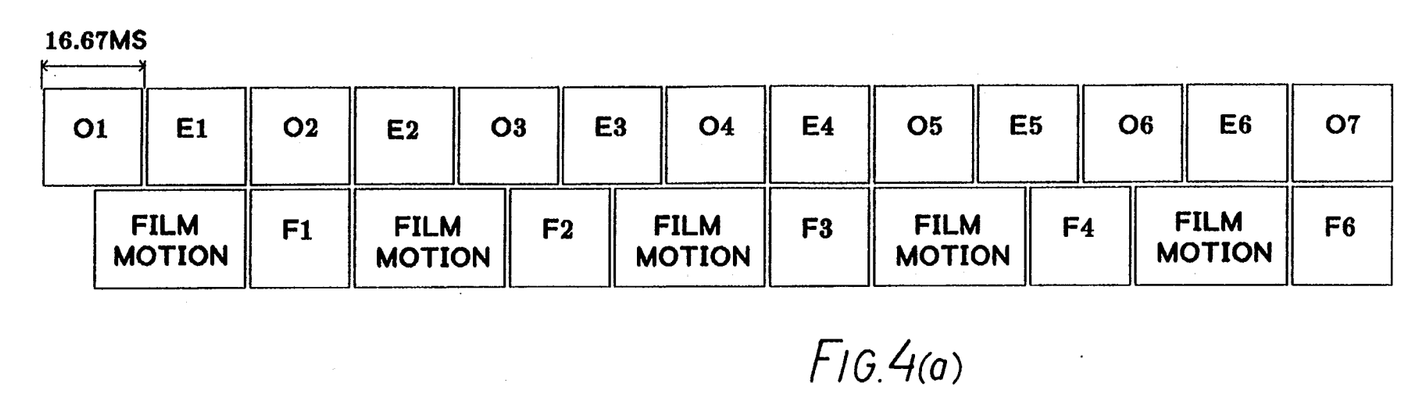
FIGS. 4a–4b illustrate a preferred sequence for combining fields from a television signal with a 60 Hz field rate to derive information for recording on film at 24 film frames per second.
Figure 4B:
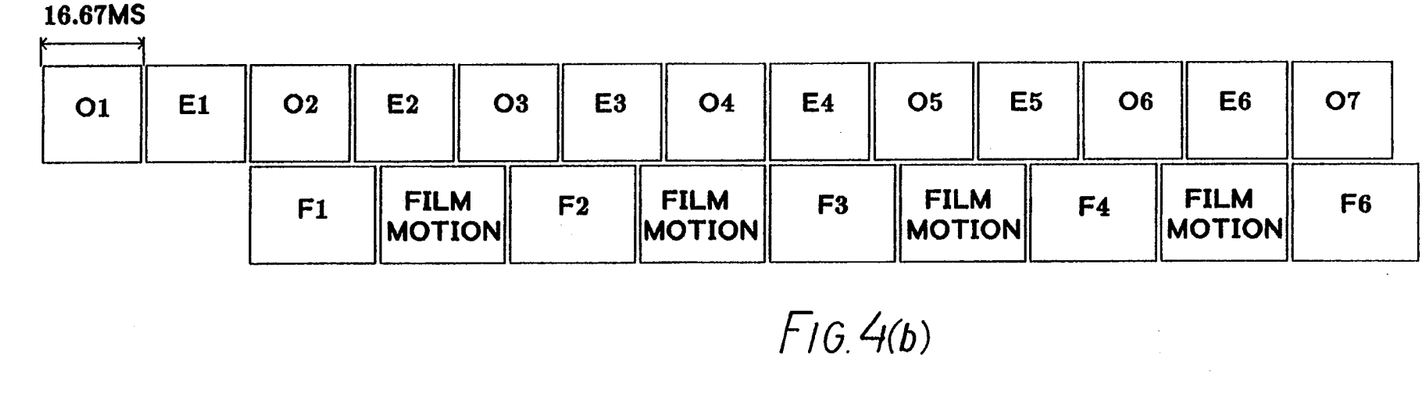

When recording film at 24 frames per second from a 60 Hertz picture source such as 525/60, 1050/60 or 1125/60, a further complication arises which can be explained by means of FIG. 4.

In FIG. 4(a), 01, E1, 02, etc., represent the incoming interlaced video fields on any of the above systems, where 01 means the first field of odd numbered lines and E1 means the first field of even numbered lines, and so on. At 60 fields per second the field period is 16.67 milliseconds. Since the film has a mean velocity of 24 frames per second, the spacing of the film exposures is exactly 2.5 television fields. Thus in FIG. 4(a), the film is exposed for one television field period, and the film is transported for the remaining 1.5 field periods. The only difference in FIG. 4(b) is that the film exposure is 1.25 field periods and the film transport is also 1.25 field periods, a 1:1 mark space ratio, which is a common camera format. In both cases the 5th television frame and every subsequent 5th frame must be omitted to reconcile the difference between the video rate and the film rate. When there is no motion in the picture this causes no problem, but when motion is detected, the interpolator in FIG. 3 comes into operation, to produce new interpolated film frames for F2, F3, and F4, and every subsequent group of three frames in sequence.

Figure 2:
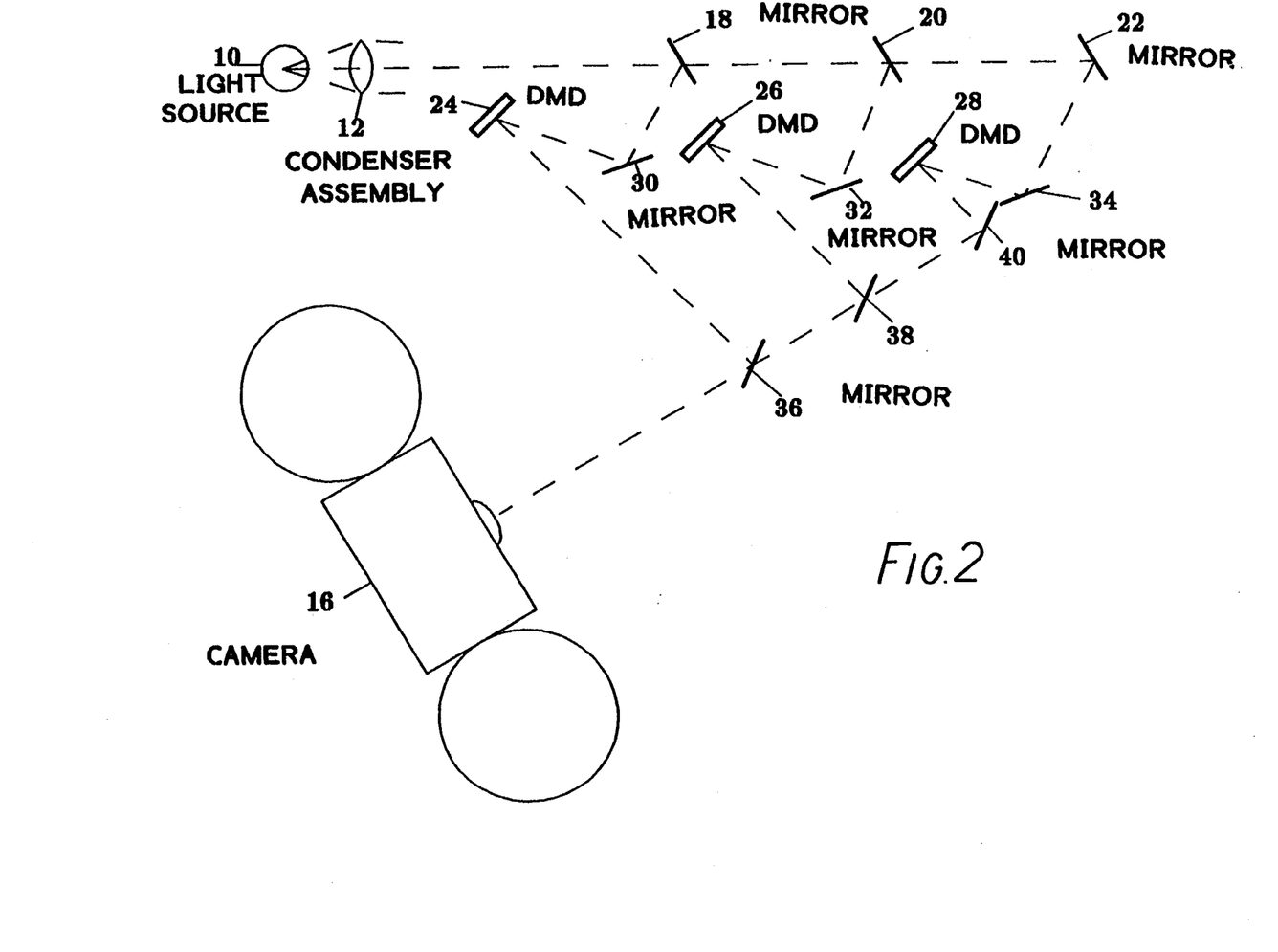
FIG. 2 is a diagram of a television recorder to expose color film using three DMD's.

FIG. 2 shows a preferred optical layout when exposing color film. Light from source 10 is formed into a parallel beam by the condenser assembly 12 and directed towards dichroic mirrors 18 and 20 and fully reflecting mirror 22. Depending upon the spectrum of the light source, there may be a need for a filter to remove non-visible spectrum components such as infrared. Dichroic mirror 18 reflects the red component of the spectrum and transmits the remaining shorter wavelengths. The red component is then reflected by mirror 30 to the DMD 24, which is modulated by the red video signal. The modulated red light beam is then reflected by the red dichroic mirror 36 towards the camera.

Similarly, the blue component of the spectrum is reflected by dichroic mirror 20 via mirror 32 to the blue DMD 26 and then via blue dichroic mirror 38 to the camera. The remaining green component of the spectrum is reflected via mirrors 22 and 34 onto the green DMD 28 and then via mirror 40 to the camera.

Instead of using motion compensation as described in connection with FIG. 3, there are two further methods by which successive fields of a television signal may be combined to derive information suitable for recording on the film. These methods are flawed, when the film frame rate is not a simple fraction of the television field rate, in that the information on successive film frames will not be appropriate for equal intervals of time; in the case from a 60 Hz field rate to 24 film frames per second the information recorded on the film would be appropriate for intervals of 33.33, 50.00, 33.33, 50.00 ms, the two values alternating. There is thus an alternating error of ±8.33 ms about the correct average interval of 41.67 ms for 24 frame per second motion picture film. This error causes judder of motion, which will be visible when the film is projected but it is not usually disturbing. It would not arise when converting from a field rate of 50 Hz to 25 frames per second (fps) film nor from 60 Hz to a 30 fps film rate. Apart from additional fields being used for control information, these two further methods use information simultaneously from an odd number of television fields, such as three, and both rely, in principle, on being able to provide information for alternate lines of the DMD from the lines appearing in the centre field, essentially unchanged.

The two methods differ, however, in the way in which the information is derived for the remaining lines.

Figure 5:
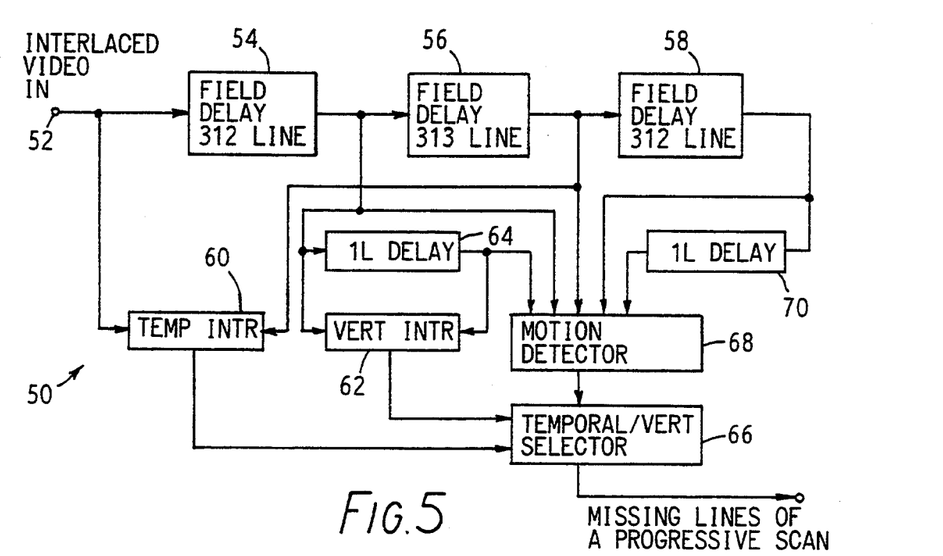
FIG. 5 is a block diagram showing an adaptive way of combining successive fields of a television signal to derive information for recording on film.

One method is adaptive and is illustrated in FIG. 5. The adaptive combining circuit 50 shown in FIG. 5 has an input 52 for receiving the incoming interlaced video circuit and three delays 54,56,58 connected in cascade to the input 52 providing delays of 312, 313, and 312 lines respectively. A temporal interpolator 60 receives the input signal and the output of delay 56. A vertical interpolator 62 receives the output of delay 54, both directly and through a further one-line delay 64. The output of either the temporal interpolator 60 or the vertical interpolator 62 is selected under the control of a selector circuit 66. The selector circuit 66 is controlled by a motion detector 68 which receives the outputs of the main delays 54,56 and 58, the output of delay 64, and the output of a further one-line delay 70 connected to the output of delay 58. The output of selector 66 provides the output 72 of the circuit 50 and provides the missing lines of a progressive or non-interlaced scan.

In the adaptive method the information for each point on the remaining lines is provided, as shown in FIG. 5, by temporal interpolation (60) such as by averaging corresponding points of the previous and succeeding field for those parts of the picture that are not moving. When significant movement is detected however the interpolation changes from temporal to vertical (62), for example by taking the average of points of the picture from the centre field, immediately above and below that of the wanted point. An indication of motion, pixel by pixel, is obtained by comparing in detector 68 the signal at corresponding points two fields apart. If the difference is zero then that part of the picture is assumed static, whereas if the difference is significant, movement is likely. It is important with such a simple system that one of the two fields used in the comparison shall be the one from which the vertical interpolation is derived. If this arrangement is not used the pixels marked as containing motion show where the object was a field before and a field after but not on the field providing the vertical interpolation. This can result in temporal interpolation being used for the actual position of the moving object rather than the vertical interpolation which is desired. In addition to the problems of temporal aliasing such a simple system of motion detection also suffers from sensitivity to noise. Instead of working with the signal at identical points two fields apart, it is better to use two identical arrays of closely spaced sample points around the position of each pixel, on two alternate fields, with a different array of closely spaced sample points on the field in-between. The different array is required due to interlace.

This is shown in very simple form in FIG. 5, which shows only how the missing lines are derived. It should be realised that for this adaptive method motion needs to be detected but velocities do not need to be determined.

Figure 6:
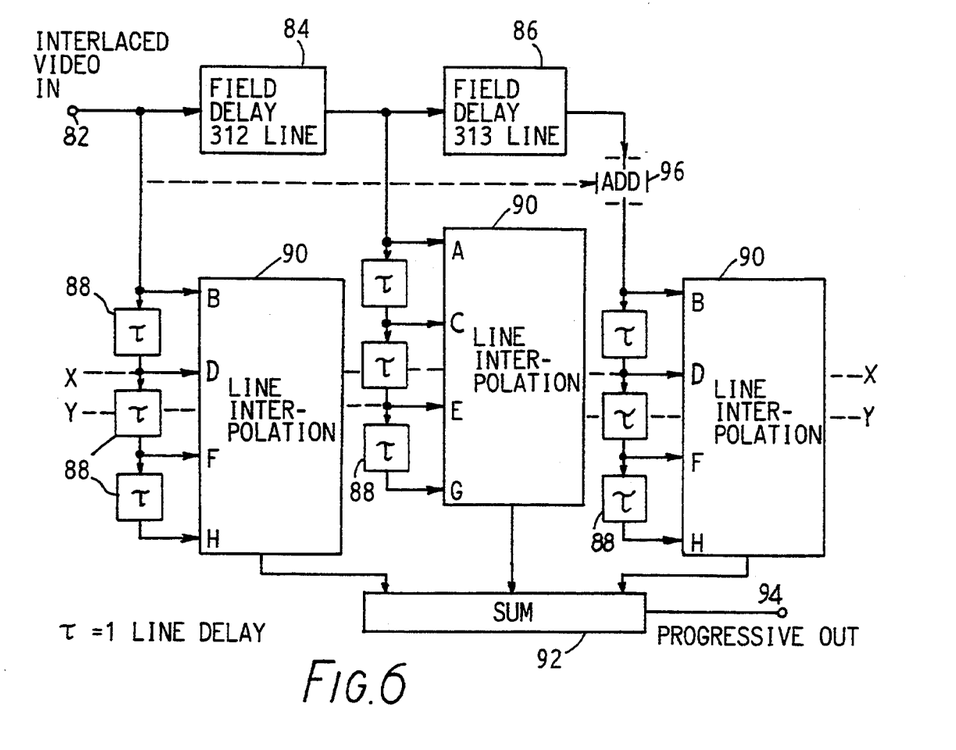
FIG. 6 is a block diagram showing a further method of combining successive fields of a television signal to derive information appropriate for recording on film.

The other method makes no attempt to detect motion and is shown diagrammatically in FIG. 6. In this case the circuit has an input 82 which is connected to two delays 84,86 connected in cascade and providing delays of 312 and 313 lines respectively. To the input and the outputs of the two delays are connected chains of one-line delays 88, three such delays being shown in each case. A line interpolation circuit 90 having four inputs is then connected to the four tapping positions on each delay chain. The outputs of the three line interpolators 90 are added in a summing circuit 92 and applied to an output 94. It will be appreciated that the delays 88 and interpolators, or weighted averaging circuits 90, constitute three transversal filters.

In FIG. 6 the central field could be used as before for those lines of the DMD which correspond with the lines of that field. The relative vertical positions of the line delays and the vertical interpolation in this figure have been chosen to compensate the 312 and 313 line delays of the field delays. The dashed line Y—Y indicates the case where a line of the DMD mirrors corresponds with a television line of the central field. For this case the multiplying coefficients used for the signals at C & G must be equal and for A must be zero. For the previous and following field D & F must be equal as well as B & H and the sum of B, D, F & H must be zero if the temporal response is to remain unchanged. Note that the coefficients are symmetrical about the line Y—Y. If it were desired to keep the maximum vertical resolution for lines such as Y—Y then all the multiplying coefficients, other than that used for E, should be zero. Although maintaining vertical resolution is desirable, it is more important to balance the vertical resolution of lines of type Y—Y and X—X; this reduces alias effects.

The dashed line X—X indicates the case where a line of DMD mirrors falls midway between the lines of the central field. For these lines, the principle is that the central field can be used to provide all the horizontal resolution and all but the high frequency vertical resolution. For this case the multiplying coefficients used for the signals at C & E must be equal as well as for A & G. For the outer fields the multiplying coefficients for signals at B & F must be equal, H must be zero and the sum of the coefficients B, D, F & H must again be zero. These are consistent with the conditions needed to provide an enhancement of vertical resolution to compensate the loss of vertical resolution which inevitably occurs when interpolation is used in producing the signal from the central field. The coefficients are now symmetrical about the line X—X.

This system ensures that the temporal aperture, except for high vertical frequencies, is that of a single field; this prevents any increase of movement blurring. To keep the gain constant at lower frequencies the sum of the coefficients of the central filter must be constant.

For a small proportion of television scenes, particularly when the camera pans rapidly, the amount of movement judder when the film is projected could be excessive. Under these adverse conditions the pictures could be made more acceptable by adding movement blur; this can be introduced by making the sum of B, D, F & H positive, decreasing the sum of A, C, E & G appropriately to keep the gain constant. An increase of blurring is generally disadvantageous so it would be best to limit its use to those occasions when it would be beneficial.

FIG. 6 has been described above as if it needed three transversal filters. However by adding the input to the first field delay 84 to the output of the second field delay, as shown in the dashed lines by the adder 96, the same results can be achieved without the left hand transversal filter. It is also possible to achieve some economies in the transversal filters by using the symmetry of the coefficients but this will be understood by those skilled in the art. Using the symmetry of the coefficients is easier if the filter is only used for one type of line (even or odd). Although other realizations are possible, this is more compatible with using two sets of interpolators each set producing one type of line.

It should be realized that the spatial resolution of the eye decreases significantly with movement. The extent of this decrease depends on many factors but dominant among these is the extent to which the eye is tracking the motion. It should also be realized that the integration time of television cameras is usually about one field and this equally causes loss of spatial resolution in the direction of motion. It is reasonable to expect that where the film frame rate is a simple fraction of the field frequency all three approaches would give very similar subjective results, since the difference between the approaches would only be of loss of spatial resolution where motion occurs.

The portrayal of motion from television cameras is much smoother than for normal motion picture film since firstly the field rate for television is at least twice that of the film frame rate and secondly the ratio of integration time to the temporal repeats is normally about 1 for television cameras compared to ½ for normal film cameras. Considerable care is given to limit the speed at which a film camera is panned, as a function of focal length, to ensure that an acceptable smoothness of pan is achieved; the same limitations do not apply for television cameras. A television program with perfectly acceptable pans when viewed as television, might contain pans which will be unacceptable when converted for film showing; an improvement of some of the pans could be achieved by introducing additional motion blurring during the more critical pans even though the additional blurring would generally be harmful. It therefore seems desirable that the interpolation, to provide the progressive scan for each film frame, should also be capable of adding a controllable although limited amount of motion blurring.

A film for projection in the theater should be capable of showing a contrast range of the order of 1000:1. At first sight this tends to imply that the time during which each individual mirror of the DMD reflects the light source into the objective lens must also be capable of modulation over the range of 1000:1. However, this implication is not necessarily true in that it assumes firstly, that the gamma of the film from exposure to final optical projection is 1 and secondly that the light being reflected by the mirrors is constant.

The gamma of a film is a variable depending on the characteristics of the film stock, and on the type and duration of the film development processing. An increase of development time, either for the negative or the positive, achieved by a reduction of the linear speed as the film passes through the development baths, could be used to increase the overall film gamma to, say, 1.5. With this increase the ratio of maximum to minimum time that a mirror is "on" would now be reduced to 100:1 for a 1000:1 contrast range on projection. The circuitry includes a circuit for reducing the dynamic range of the incoming video signal before it is applied to the DMD control system.

However, this does not mean that one hundred equal increments of exposure would be sufficient. Finer steps of exposure times would be necessary at the lower durations of exposure, although the steps could become coarser towards the longer exposure durations. When the gamma of the film is increased the optimum step distribution becomes more uniform, up to a gamma of 3 when it is nominally uniform. For a gamma of 3, the variation of exposure time would be 10:1 but about 100 equally spaced steps would be necessary.

For a gamma of 1.5 about 500 steps would be desirable if they are to be equally spaced. If the individual increments of exposure available were in the proportions:

2, 3, 4, 8, 16, 32, 64, 128 and 256 then total exposures of every integer value from 2 to 511 would be available. This gives a potential ratio exposure times of 511:2 which is more than the necessary 100:1. The use of proportions:

5, 6, 7, 8, 9, 10, 36, 72, 144 and 288 gives possible total exposure times of all integer values from 5 to 580, which again is more than sufficient.

Even if the overall film gamma were kept at 1, the necessary number of steps could be provided by using the following relative values 1, 2, 4, 8, 16, 32, 64, 128, 256 and 512. If a mirror could be in the "on" state for any combination of these times then the total exposure for a pixel of film could have any integer value from 1 up to 1023, the relevant mirror being "on" for between 1 and 10 of these time periods.

Instead of varying the time durations for which the mirrors are "on", it might be possible to use a light source which can be turned on for varying amounts of brightness. Each mirror element is then "on" or "off" for each of a series of successive brightness values.

It would also be possible to use a combination of varying time durations and varying brightness levels to give the full range of steps required. Particularly where a film gamma value of 1 is used, it may well be better to have a more limited range of brightness values but with the mirror being on for a limited choice of periods at each brightness value.

The use of an overall film gamma greater than 1, or the use of time modulation of the brightness of the illumination on the film while it is being exposed, can be used to reduce significantly the ratio of the maximum to minimum time that a mirror needs to be "on". These two techniques are not mutually exclusive but can be used together if desired.

If neither an increased film gamma nor a system of brightness modulation were used, the 1000:1 ratio of "on" times could cause some difficulties for a film recorder to operate in real time. A minimum of about 5 milliseconds is required to transport the film from one frame to the next when allowance is made for the time required for accurate registration; it would be much easier mechanically if a half of the total time were allowed for film transport and registration. At 25 film frames per second this would leave 20 ms for exposing the film. The maximum desirable exposure time is therefore 20 ms and the minimum would be 20 $\mu$s for a 1000:1 exposure range, assuming that there is no dead time when the mirrors are not capable of reflecting light correctly. This would appear to be realizable in real time but without much margin.

Figure 7:
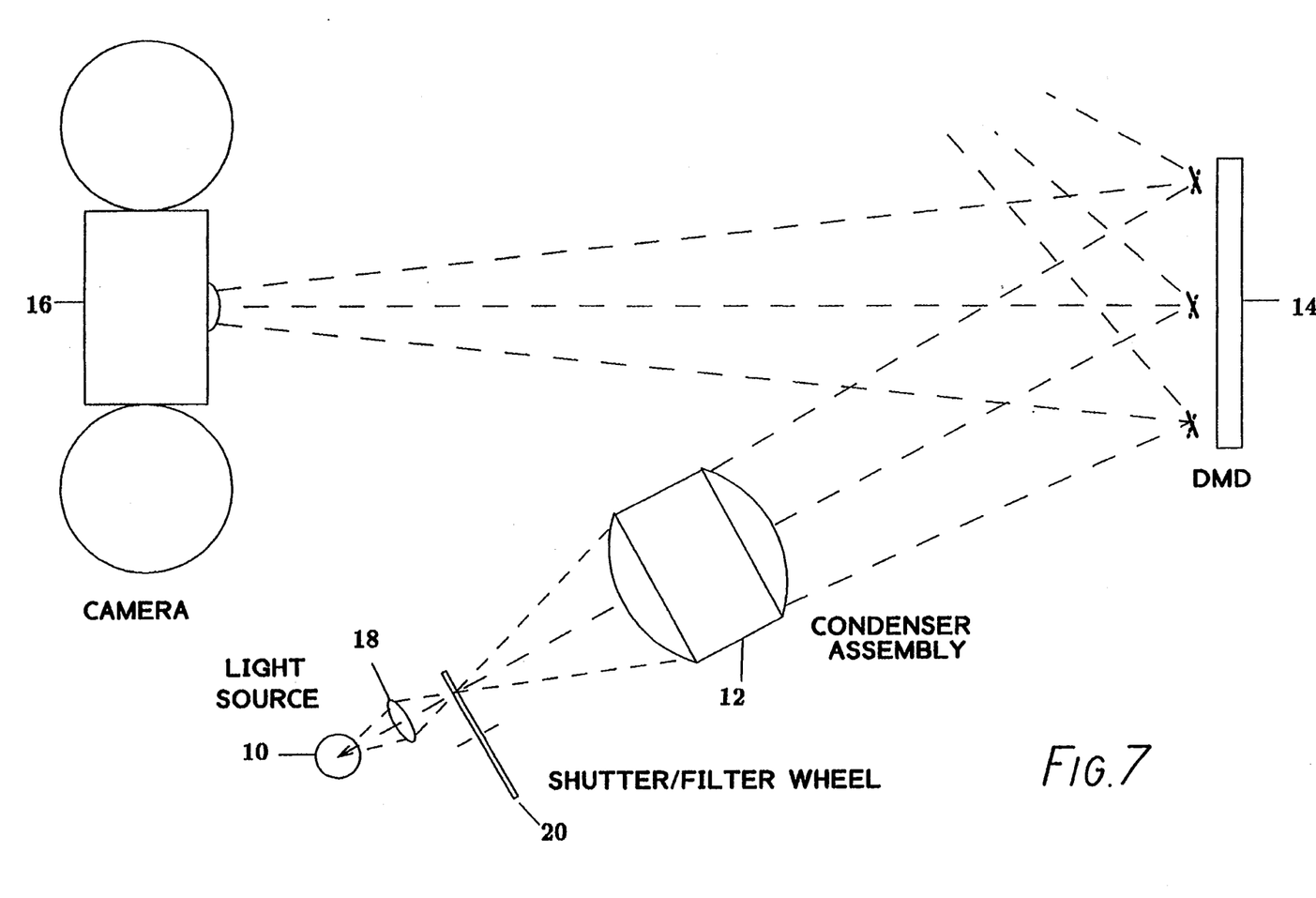
FIG. 7 is a diagram of a television recorder to expose color film sequentially using one DMD and a color filter wheel.
Figure 8:
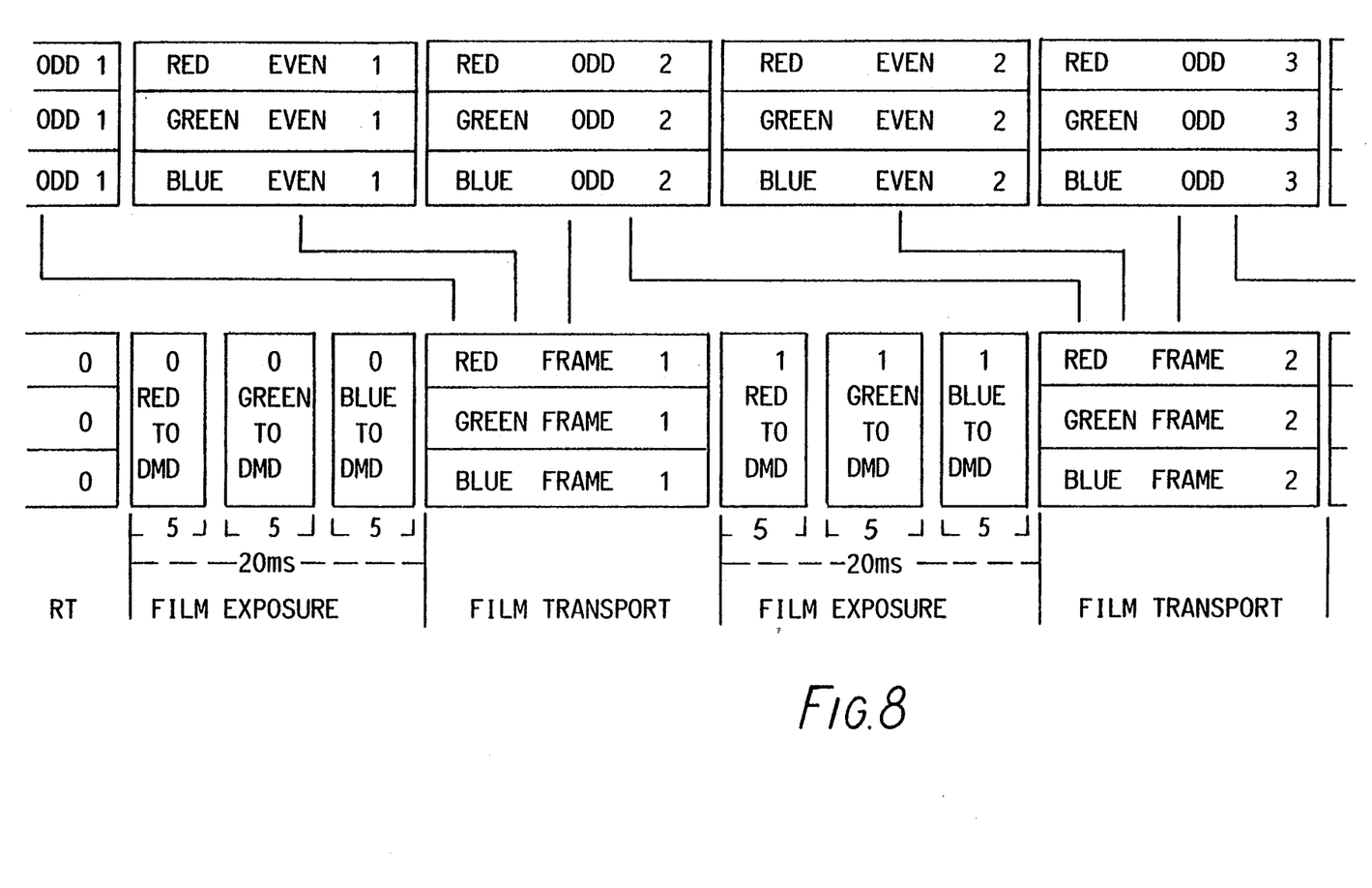
FIG. 8 is a timing diagram indicating the conversion from simultaneous to sequential color.

However, if either technique mentioned above were used to reduce the 1000:1 exposure range there appears to be at margin of perhaps 10:1. Some of this margin could be used to realize a more compact recorder by using one DMD, time multiplexed for red, green and blue as shown diagrammatically in FIG. 7. FIG. 8 shows a rudimentary timing diagram for such a system. It would seem sensible to allow about 5 ms for exposing each color which would reduce the margin to about 2½:1. There could be a time of about 2½ ms between the end of exposing one color before the next color starts to be exposed and this should provide more than adequate time for a color filter wheel to move from one color sector to the next. The color filter wheel could be combined with a shutter and if this rotates once per film frame, there would be one opaque sector of 180°, three color sectors each of nominally 45° interspersed with sectors of nominally 22½°, which could be opaque. The angles given are all nominal but would have to be considered in detail with the design of the optics and mechanics.

Obviously, consideration has always to be given to the timing of the film pull down, with respect to the presentation of the information to the mirrors of the DMD. The use of time multiplexing of one DMD for three colors does increase the required accuracy of timing of the shutter/color filter wheel but only to a moderate extent.

We claim:

1. Apparatus for recording a video signal on cinematographic film having unexposed photographic emulsion thereon, the apparatus comprising:

a camera having a light source, a transport mechanism for passing the cinematographic film through an image plane for exposing said cinematographic film frame-by-frame, each frame of said film being maintained in said image plane for a predetermined time period corresponding to a single frame time interval, and a two dimensional array of deformable mirror devices arranged relative to said light source and said image plane for selectively reflecting light from said light source to said image plane so as to expose the photographic emulsion of the film;

each of said deformable mirror devices being switchable between a disabled and an enabled position during each of a multiplicity of separate sub-frame time intervals comprising said single frame time interval, each of said deformable mirror devices reflecting light from said light source to said image plane when in said enabled position so as to provide respective light exposures of the photographic emulsion of the film for each of said multiplicity of separate sub-frame time intervals; and control means responsive to an incoming video signal for controlling the switching of each of said deformable mirror devices during said multiplicity of separate sub-frame time intervals in response thereto, wherein a combination of said respective light exposures is provided for each of said deformable mirror devices that are enabled in said single frame time interval, the total number of such possible combinations of said respective light exposures greatly exceeding the number of said multiplicity of separate sub-frame time intervals, so that the cinematographic film, when developed, will represent an optical image of the video signal.

2. Apparatus according to claim 1, in which the transport mechanism includes an intermittent-motion film transport mechanism.

3. Apparatus according to claim 1, in which the control means includes a picture store to store an incoming video signal.

4. Apparatus according to claim 1, in which the control means includes motion compensation means for compensating motion between successive video fields.

5. Apparatus according to claim 1, in which the control means is adapted to receive an interlaced video signal.

6. Apparatus according to claim 1, in which the control means includes means for receiving video fields at one rate and generating outputs for the deformable mirror device at another rate.

7. Apparatus according to claim 1, in which the control means includes interpolation means for generating output lines from a plurality of adjacent lines selected from the same and the adjacent fields of the input video signal.

8. Apparatus according to claim 7, in which the control means includes means for detecting apparent motion in the scene represented by the input video signal, and means for varying the interpolation function in response to the presence or absence of motion.

9. Apparatus according to claim 8, including means for selecting adding movement blurring.

10. Apparatus according to claim 7, in which the interpolation function is temporally symmetrical about a central field.

11. Apparatus according to claim 10, in which contributions are taken from a plurality of lines in each of the fields before and after the central field with weighting coefficients which can be positive or negative, the sum of the weighting coefficients for each of the said adjacent fields being substantially zero.

12. Apparatus according to claim 7, in which the interpolation function is vertically symmetrical about the output lines.

13. Apparatus according to claim 1, in which the control means includes means for controlling the dynamic range of the input video signal prior to switching of said deformable mirror devices such that the dynamic range of the respective light exposures is reduced.

14. Apparatus according to claim 1, in which said multiplicity of separate sub-frame time intervals are of different lengths, add in which said control means controls said deformable mirror devices such that individual elements of said deformable mirror devices are enabled for different time durations comprised of one or more selected ones of said separate sub-frame time intervals.

15. Apparatus according to claim 1, in which said light source includes means for modulating the light brightness thereof to take different values during successive sub-frame time intervals of said multiplicity of separate sub-frame time interval, and in which said control means controls said deformable mirror devices such that individual elements of said deformable mirror devices are enabled for said different values of light brightnesses.

16. Apparatus according to claim 1, in which said light source includes means for modulating the light brightness thereof to take different values during successive sub-frame tire intervals of said multiplicity of separate sub-frame time intervals, and in which said control means controls said deformable mirror devices such that individual elements of said deformable mirror devices are enabled for different time durations and for said different values of light brightnesses.

17. Apparatus according to claim 13, in which said deformable mirror devices are arranged to reflect red, green and blue light onto said image plane in time multiplexed manner.

18. Apparatus according to claim 1, including three deformable mirror devices arranged respectively to reflect red, green and blue light onto said image plane, and in which said control means controls said three deformable mirror devices in accordance with the red, green and blue components of light.

19. Apparatus according to claim 18, in which the optical system for said deformable mirror devices includes dichroic mirrors.

20. A method of recording a video signal on cinematographic film having unexposed photographic emulsion thereon, the method comprising the steps of:

passing cinematographic film to be exposed frame-by-frame through an image plane, each frame of said film being maintained in said image plane for a predetermined time period corresponding to a single frame time interval;

reflecting light from a light source onto said image plane by enabling selected ones of a two dimensional array of deformable mirror devices, each of said deformable mirror devices being switchable between a disabled and an enabled position during each of a multiplicity of separate sub-frame time intervals comprising said single frame time interval, each of said deformable mirror devices reflecting light from said light source to said image plane when in said enabled position so as to provide respective light exposures of the photographic emulsion of the film for each of said multiplicity of separate sub-frame time intervals;

controlling the switching of each of said deformable mirror devices during said multiplicity of separate sub-frame time intervals in response to an input video signal, wherein a combination of said respective light exposure provided for each of said deformable mirror devices that are enabled in said single frame time interval, the total number of such possible combinations of said respective light exposures greatly exceeding the number of said multiplicity of separate sub-frame time intervals, so that the cinematographic film, when developed, will represent an optical image of the video signal; and developing the film following exposure.

21. A method according to claim 20, further comprising subjecting the input video signal to compression of the dynamic range thereof prior to controlling the array of deformable mirror devices, in which the film is developed such as to have a gamma factor of greater than unity so as substantially to compensate for the dynamic gain compression.

22. Video signal to optical transducer apparatus, comprising:
   a light source including means for modulating the light brightness thereof to take a plurality of different values of light brightnesses;
   a two-dimensional array of deformable mirror devices having a plurality of individual mirror elements, said array of deformable mirror devices being structured and arranged to selectively reflect light from the light source so as to provide an optical output when one or more of said mirror elements are enabled; and
   control means responsive to an incoming video signal to control the enabling of individual ones of said mirror elements in response thereto, such that said individual mirror elements of said array of deformable mirror devices are enabled for different ones of said plurality of different values of light brightnesses.

23. Apparatus according to claim 22, in which the control means additionally controls the array of deformable mirror devices such that said individual mirror elements of the array of deformable mirror devices are enabled for different time durations.

24. An apparatus for exposing a film as a function of a video signal, said apparatus comprising:
   (a) a light source;
   (b) means for intermittently transporting a film across an image plane on a frame-by-frame basis, and for maintaining each frame of said film in said image plane for a predetermined time period corresponding to a single frame time interval; and
   (c) an image system for focusing light from said light source onto said image plane so as to expose photographic emulsion of said film, said image system including:
      (1) a two-dimensional array of reflecting elements, each of said reflecting elements corresponding to a respective pixel of each frame of said film; and
      (2) control apparatus responsive to a video signal for controlling the enablement of each of said reflecting elements on a frame-by-frame basis so as to control the exposure of said film, said control apparatus controlling respective lengths of time that each reflecting element reflects light onto a frame, said control apparatus being capable of enabling each reflecting element for varying periods during each time frame, the period that each reflecting element is enabled being equal to one or more respective sub-frame time intervals, each of said respective sub-frame time intervals being of a different length than the remaining of said sub-frame time intervals so that said film, when developed, will represent an optical image of said video signal.

25. Apparatus according to claim 24, wherein each of said respective sub-frame time intervals equals $\frac{1}{2^n}$ fraction of said single frame time interval, wherein n is a whole number greater than 0.

26. An apparatus for exposing a film as a function of a video signal, said apparatus comprising:
   (a) a light source;
   (b) means for intermittently transporting a film across an image plane on a frame-by-frame basis, and for maintaining each frame of said film in said image plane for a predetermined time period corresponding to a single frame time interval; and
   (c) an image system for focusing light from said light source onto said image plane so as to expose photographic emulsion of said film, said image system including:
      (1) a two-dimensional array of reflecting elements, each of said reflecting elements corresponding to a respective pixel of each frame of said film; and
      (2) control apparatus responsive to a video signal for controlling the enablement of each of said reflecting elements on a frame-by-frame basis so as to control the exposure of said film, said control apparatus controlling respective lengths of time that each reflecting element reflects light onto a frame, said control apparatus being capable of enabling each reflecting element for varying periods during each time frame, the periods during which each reflecting element is enabled being equal to one or more respective sub-frame time intervals, each of said respective sub-frame time intervals being of a respective length, the length of at least some of the sub-frame time intervals being different than the remaining of said sub-frame time intervals so that said film, when developed, will represent an optical image of said video signal.

* * * * *

UNITED STATES PATENT AND TRADEMARK OFFICE
CERTIFICATE OF CORRECTION

PATENT NO. : 5,369,433
DATED : November 29, 1994
INVENTOR(S) : John L.E. Baldwin, et al.

It is certified that error appears in the above-indentified patent and that said Letters Patent is hereby corrected as shown below:

On the title page of the above-identified patent, at item [21], the application number "864,327" should read --864,427--.

Signed and Sealed this

Ninth Day of May, 1995

Attest:

BRUCE LEHMAN

Attesting Officer

Commissioner of Patents and Trademarks